US009749691B2

United States Patent
Cremonesi et al.

(10) Patent No.: US 9,749,691 B2
(45) Date of Patent: Aug. 29, 2017

(54) CLIENT-SIDE RECOMMENDATIONS ON ONE-WAY BROADCAST NETWORKS

(75) Inventors: Paolo Cremonesi, Milan (IT); Roberto Turrin, Mornago VA (IT)

(73) Assignees: CONTENTWISE S.R.L., Milan (IT); POLITECNICO DI MILANO, Milan (IT)

( * ) Notice: Subject to any disclaimer, the term of this patent is extended or adjusted under 35 U.S.C. 154(b) by 0 days.

(21) Appl. No.: 14/391,836

(22) PCT Filed: Apr. 12, 2012

(86) PCT No.: PCT/IT2012/000103
§ 371 (c)(1),
(2), (4) Date: Oct. 14, 2014

(87) PCT Pub. No.: WO2013/153562
PCT Pub. Date: Oct. 17, 2013

(65) Prior Publication Data
US 2015/0089524 A1    Mar. 26, 2015

(51) Int. Cl.
*H04N 21/466* (2011.01)
*H04N 21/236* (2011.01)
*H04N 21/25* (2011.01)
*H04N 21/45* (2011.01)
*H04N 21/475* (2011.01)
*H04N 21/4788* (2011.01)
(Continued)

(52) U.S. Cl.
CPC ......... *H04N 21/4668* (2013.01); *G06Q 30/02* (2013.01); *H04N 21/23614* (2013.01);
(Continued)

(58) Field of Classification Search
CPC ......... H04N 21/4826; H04N 21/25891; H04N 21/4668; H04N 21/4756; H04N 21/4532; H04N 21/4788; G06Q 50/01
See application file for complete search history.

(56) References Cited

U.S. PATENT DOCUMENTS 5,790,935 A * 8/1998 Payton ............. H04N 21/25891
348/E7.073
2003/0051240 A1* 3/2003 Schaffer ............. H04N 21/4756
725/34
(Continued)

FOREIGN PATENT DOCUMENTS

EP        1975866 A1    10/2008
WO     2005054788 A2     6/2005

OTHER PUBLICATIONS

Campochiaro et al., "Do Metrics Make Recommender Algorithms?", Advanced Information Networking and Applications Workshops, 2009, pp. 648-653, XP031480838.
(Continued)

*Primary Examiner* — Hai V Tran
(74) *Attorney, Agent, or Firm* — Young & Thompson

(57) ABSTRACT

A method and a client-side Recommender system on One-Way Broadcast Network includes at least a one-way channel connecting a broadcasting station to a set-top-box device of a first set of users, the set-top-box including a memory, a computation and driving unit for tracking the user activity, storing a user profile, generating and displaying a ranking of recommended media items, the ranking being determined by the computation unit through a recommender model stored on the memory. The system further includes a collaborative dual module, a first back-end module running on a auxiliary server connected to a two-way network and belonging to an auxiliary domain, this first back-end module leveraging external data sources to collect community based information on at least part of the media items, while the recommender model stored on the memory being a second front-end module, wherein the broadcasting station and the set-top-box device belong to a target domain.

10 Claims, 1 Drawing Sheet

(51) Int. Cl.
*G06Q 50/00* (2012.01)
*H04N 21/2665* (2011.01)
*H04N 21/434* (2011.01)
*H04N 21/442* (2011.01)
*H04N 21/462* (2011.01)
*G06Q 30/02* (2012.01)

(52) U.S. Cl.
CPC ....... *H04N 21/252* (2013.01); *H04N 21/2665* (2013.01); *H04N 21/4348* (2013.01); *H04N 21/442* (2013.01); *H04N 21/44222* (2013.01); *H04N 21/4532* (2013.01); *H04N 21/4622* (2013.01); *H04N 21/4667* (2013.01)

(56) References Cited

U.S. PATENT DOCUMENTS

| 2008/0022307 | A1 | 1/2008 | Jeong et al. | |
|---|---|---|---|---|
| 2008/0256579 | A1* | 10/2008 | Verhaegh | H04N 21/4532 725/46 |
| 2009/0228918 | A1* | 9/2009 | Rolff | H04N 21/4826 725/34 |
| 2009/0293079 | A1* | 11/2009 | McKee | G06Q 10/105 725/10 |
| 2010/0088649 | A1* | 4/2010 | Kemp | G06Q 30/00 715/845 |
| 2011/0010741 | A1* | 1/2011 | Liao | H04N 21/6587 725/51 |

OTHER PUBLICATIONS

Cremonesi, et al., "Client-Side Recommendations: Content Discovery Systems for One-Way Broadcast Networks", NAB Broadcast Engineering Conference, 2012, pp. 78-84, XP040569819.

Osmanli, Osman Nuri, "A Singular Value Decomposition Approach for Recommendation Systems", XP055047477, 2012, URL:https://etd.lib.metu.edu.tr/upload/12612129/index.pdf.

International Search Report, dated Dec. 21, 2012, from corresponding PCT application.

* cited by examiner

CLIENT-SIDE RECOMMENDATIONS ON ONE-WAY BROADCAST NETWORKS

FIELD OF THE INVENTION

The present invention relates to a broadcast recommender system and method, in particular to a recommender method for a plurality of items to be purchased by users in one-way broadcast networks, such as satellite TV (DVB-S) and digital terrestrial television (DVB-T).

BACKGROUND OF THE INVENTION

As known, recommender systems help users search large amounts of digital content and services by allowing them to identify the items (e.g., movies, music, books, news, web pages, . . . ) that are likely to be more attractive or useful, inferring such recommendations on the basis of different elements (e.g., popularity, demographic information, individual or aggregate past preferences and choices, explicit ratings on a sample of suggested elements).

How much an item interests and attracts a user is called relevance. Thus, a recommender system estimates the relevance of a user based on a collection of items. Such information is especially useful in situations where the number of items is continuously growing (for instance, the huge amount of contents available on broadcast channels) and the amount of relevant data is relatively low.

These systems recommend the user on the basis of a model of the user profile, i.e., his tastes, interests or attitudes. Thus, for example, if the item collection consists of TV programs and the user to recommend is a baby, the system will propose a list of cartoons because the baby's profile somehow matches with cartoons and it does not match with horror or action films.

The increasingly vast arena of recommender systems can be classified along multiple dimensions. A key taxonomic criterion is to distinguish between systems that offer non personalized and personalized recommendations. While non-personalized recommender systems (e.g., most popular movies) do not take into account the user profile, personalized systems make their recommendations on the basis of a "user model" (e.g., past user behavior, explicit or implicit user interests).

The two main classes of personalized systems are content-based and collaborative systems. The former suggest items whose content is similar to the content of items that the user rated positively in the past, while the latter ignore content and exploit "collective preferences of the crowd".

In particular, content-based algorithms recommend items whose content is similar to the content of items the user has positively rated in the past. Similarity is computed based on the explicit content features associated with the items (e.g., a movie can be characterized by a genre, a director, a list of actors, and a summary). Since such recommender systems tend to recommend items with the same characteristics as the ones a user liked in the past, the items typically lack of novelty, meaning the system proposes a limited variety of unexpected recommendations.

On the other hand, collaborative algorithms recommend items on the basis of the ratings provided by groups of users. Such approaches generate recommendations using different users' rating profiles and suggest items that other users with similar tastes "liked" in the past. The degree to which two user tastes are deemed similar is based on the similarity of their rating histories. Roughly speaking, the approach can be summarized as "people who watched this TV program also watched . . . ". Collaborative techniques are the most popular and widely implemented because their integration in existing domains is relatively easy and their quality is generally higher than that of other techniques.

Collaborative recommender systems are known to provide most accurate recommendations compared to content-based recommender systems.

However, collaborative recommender systems are typically designed for application to two-way or bidirectional environments, where a plurality of users' preferences can be detected and collected, processed at a backend side and then feed-back to the user device again in form of a recommendation. Conventionally, a collaborative recommender system is designed for two-way TV service (e.g., IPTV, OTT), where the return channel—i.e., the communication from the user's set-top-box to the service provider—allows a centralized service to identify and monitor users actions in order to generate personalized recommendations.

Traditional TV systems only allow one-way communication (e.g., DVB-S and DVB-T), preventing the use of a centralized collaborative recommendation engine. In fact, traditional broadcast media delivery systems such as DVB-S and DVB-T are based on one-way communication channels and do not allow to use traditional recommender systems implemented as back-end service, where recommendations for a specific user are computed by a back-end server. In fact, a broadcast recommender system cannot interrogate the back-end server. In such an architecture, the component in charge of generating recommendation is the STB (set top box), i.e., the apparatus the user interacts with and that displays both media broadcast by the content provider and other information, among which recommendations (i.e., suggestions about items that are likely to be of interests for the user).

This configuration makes collaborative filtering not feasible since such approach to recommendation operates on collections of multiple user profiles, information not available since each STB is aware only of its own user preferences.

Moreover, STBs run software applications (e.g., a recommender system) but face with embedded systems with limited memory and computation capabilities.

Thus, conventional broadcast recommender methods are so limited to non-personalized or to keyword-based approaches.

Non Personalized

The simplest way of providing recommendations is by means of non-personalized approaches. For instance, the service provider can compose an editorial list of top-rated or top-viewed movies and broadcast this list to each TV set, which will show this list to users. In addition, the STB can be added the capability of discarding the display of movies/TV programs the user has already watched in the past, so that the user is not recommended with something he/she has already bought or watched.

Keyword-Based

The STB selects the items to recommend according to a recommendation score that depends on the keywords representing the item content and the user profile, expressed in terms of keywords. Item content keywords can be extracted from the item description (e.g., the EPG for TV programs), while the keywords describing the user profile can be derived from the keywords of items previously rated by the user. Each keyword in the user profile will have a weight depending on the time spent by the user watching programs with that keyword.

The higher the matching between the item keywords and the user profile keywords the higher the recommendation scores. The items with the highest recommendation score will be recommended to the user by the STB.

In particular, according to the prior art, it has already been proposed to implement a recommender system within the same set-top-box for this kind of one-way TV services. This is typically a content-based system, relying only on items' descriptions and a user model built on the behavior history of the same user of the device. This solution suffers of the typical drawbacks of a content-based recommender system. In particular, all the broadcast media shall contain meta-tag or other readable items which let the system recognize the content of the media, store and evaluate it and finally implement the recommendation. Additionally, as already said, this kind of design requires a high computational capacity of the set-top-box to locally implement the recommender model and update it with history data.

US2008022307 discloses an example of such a content-based recommender system for a broadcast channel TV set. A broadcast program recommendation method is disclosed, which can readily select a desired broadcast program channel for a user by selecting a plurality of broadcast program channels ranked using a usage history of said user.

Summarizing, current collaborative recommender systems for TV services require the presence of a two-way communication channel: the return channel allows the provider to identify the user and acquire, either explicitly or implicitly, his/her preferences to be used by the recommender system to suggest personalized content.

Unfortunately, traditional TV delivery systems only allow for one-way communication (e.g., satellite TV and digital terrestrial television), preventing the recommender system from identifying the users and actively collecting and comparing their preferences. As a consequence, the STB is the only component of the system aware of the user activity and, therefore, of the user preferences. In this environment of broadcast communication, the STB is the only component that can be in charge of computing the recommendation list for a TV user. This largely limits the recommendation capabilities, mainly for two reasons:

(i) the user's STB does not have any knowledge of the collective behavior of other users; therefore, the STB cannot apply collaborative recommendation techniques based on the social behavior of a community of users; this is a strong limitation as collaborative recommendation techniques are known to be the most effective and accurate, as they are able to provide novel and useful recommendations;

(ii) the user's STB is an embedded system with limited computational and memory capabilities; for this reason, the vast majority of recommender algorithms cannot be executed on the STB because their computational and memory requirements exceed the STB capabilities.

SUMMARY OF THE INVENTION

It is hence an object of the present invention to solve the above drawbacks, by supplying a method and a system in a one-way broadcasting service (where a return channel is not available) which is able to rely on a recommendation solution based on collaborative filtering.

The above object is achieved through the system as described in the attached claims.

In particular, the solution of the invention is composed by two modules, one running on a centralized computer connected to the Internet and one running in the set top box (STB) device that receives broadcast data.

According to a first aspect of the invention it is provided a client-side Recommender system on One-Way Broadcast Network, comprising at least a one-way channel connecting a broadcasting station to a set-top-box device (STB) of a first set of users, said set-top-box (STB) comprising a memory, a computation and driving unit for at least tracking the user activity, storing a user profile, generating and displaying on a TV set a ranking of recommended media items, said ranking being determined by said computation capacity unit through a recommender model stored on said memory, wherein it comprises a collaborative dual module, a first back-end module running on a auxiliary server connected to a two-way network (Internet) and belonging to an auxiliary domain (domain A), this first back-end module leveraging external data sources to collect community based information on at least part of said media items, while said recommender model stored on said memory of the set-top-box (STB) being a second front-end module, and in that the broadcasting station and said set-top-box device belong to a target domain (domain T), said auxiliary server is part of said two-way network, comprising at least two channels to gather feedback data from a second set of users on at least part of said media items, said first back-end module is processed by said auxiliary server through collaborative techniques including said feedback data collected from said second set of users, said first back-end module is transformed in a compact representation by said server and one-way broadcast to said set-top-box (STB) where it is implemented as said second front-end module.

According to another aspect of the invention, said second set of users is different from the first set of users.

According to an additional aspect, the computation capacity unit, through said second front-end module, tracks locally behavior of the user of said first set of users and compares it with the behavior of the other users of said second set of users, in order to provide said ranking of recommended media items.

Preferably, the said first back-end module is processed through hybrid recommender algorithms by combining both collaborative and content-based techniques including additional items different from said media items.

According to another aspect, the invention provides a one-way broadcast program recommendation method comprising providing a one-way channel connecting a broadcasting station to a set-top-box device (STB) of a first set of users in a target domain (domain T), wherein said set-top-box (STB) is arranged for tracking the user activity, storing a user profile, generating and displaying on a TV set a ranking of recommended media items, said ranking being determined by a computation unit of said set-top-box (STB) through a recommender model stored in a memory thereof, and further comprising the steps of operating a collaborative dual module, where a first back-end module is run on a auxiliary server belonging to a two-way network where a collaborative model is developed between an auxiliary set of users and auxiliary set of items, at least partially overlapping with said media items, belonging to an auxiliary domain (domain A), compacting and tailoring said collaborative model developed in the auxiliary domain (domain A) to be broadcast in said target domain (domain T) to be used as said recommender model stored in said memory of the set-top-box (STB) by exploiting said user activity and user profile belonging to the target domain (domain T).

Further, an aspect of the invention is a one-way broadcast program recommendation method comprising providing a one-way channel connecting a broadcasting station to a set-top-box device (STB) of a first set of users, wherein said set-top-box (STB) is arranged for tracking the user activity, storing a user profile, generating and displaying on a TV set a ranking of recommended media items, said ranking being determined by a computation unit of said set-top-box (STB) through a recommender model stored in a memory thereof, comprising the step of operating a collaborative dual module, a first back-end module running on a auxiliary server connected to a two-way network (Internet) and belonging to an auxiliary domain (domain A), this first back-end module leveraging external data sources to collect community based information on at least part of said media items, and a second front-end module being said recommender model stored on said memory of the set-top-box (STB) belonging to a target domain (domain T), wherein said auxiliary server comprises at least two channels to gather feedback data from a second set of users on at least part of said media items, said first back-end module is processed by said auxiliary server through collaborative techniques including said feedback data collected from said second set of users, said first back-end module is transformed in a compact representation by said auxiliary server and one-way broadcast to said set-top-box (STB) where it is implemented as said second front-end module.

BRIEF DESCRIPTION OF THE DRAWINGS

Further features and advantages of the system and method according to the invention will in any case be more evident from the following detailed description of a preferred embodiment of the same, given by way of example and illustrated in the enclosed drawings, wherein.

DETAILED DESCRIPTION OF THE PREFERRED EMBODIMENTS

Figure 1:
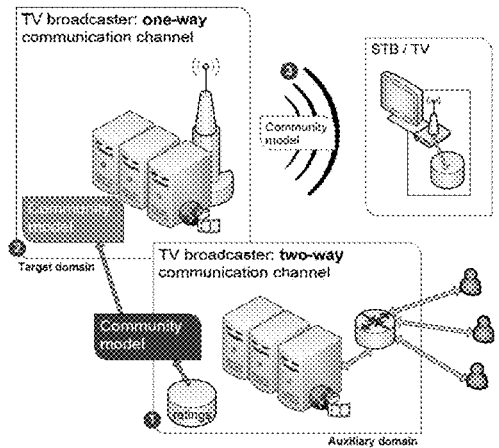
FIG. 1 is a diagrammatic view showing integrating collaborative recommendations schema in a one-way communication channel according to the invention.

The invention overcomes both the limitations explained in relation with the prior art methods, by adopting an original two-module collaborative recommender system.

The first module of the recommender system runs on a centralized computer connected to the Internet: this first module leverages external data sources to collect community based information required for collaborative recommendations. This external information is transformed into a compact representation of users' tastes (referred to as the model) and broadcast to the set-top-boxes STB of the system. The second module of the recommender system runs on each user's STB. These users can be different from the users analyzed by first module. The second module is a lightweight program that tracks locally, on the STB, the user's activities and compares them with the behavior of other users (in terms of the model processed and installed in the same STB) in order to provide recommendations to the TV watcher. The behavior of the other users is included into the model processed by the first module of the recommender system.

More in detail, according to the invention the recommendation model is built by a back-end component having access to a Internet based two-way environment (where collaborative model can be easily processed using known technologies) and regularly sent to the STB (e.g., daily or weekly), that uses it together with the user preferences in order to select the items to display to the user.

Since the model is built by the back-end, a classical recommender algorithm cannot be used but a new recommendation method is developed which is decomposed into two phases: the first phase is devoted to the creation of a model; the second phase provides recommendations from the model and the target user's profile. Because of the one-way communication characteristics of the TV scenario, the second phase needs to be totally decoupled by the first phase, with the exception of the model.

The broadcast recommender method allows implementing also hybrid recommender algorithms by combining both collaborative and content-based recommendations.

In the following detailed description, a specific notation is used having the meaning to explained in table 1.

TABLE 1

| | |
|---|---|
| Domain T | Target domain with a one-way communication channel. Provider T operates in this domain. |
| Domain A | Auxiliary domain with a two-way communication channel. Provider A operates in this domain. |
| u, e | Indexes of the users. Conventionally, u indicates a user in domain T to be recommended, while e indicates a user in domain A. |
| i, j | Indexes of items. |
| $b_{ui}$ | Rating bias for user u about item i. |
| N | Number of users in domain A's customer base. |
| M | Number of items available in domain T's catalog (i.e., suitable to be recommended). |
| $\bar{m}$ | Number of items available in domain A's catalog. |
| $r_u$ | User-u profile. A m-dimensional vector whose non-zero values correspond to the unbiased ratings of user u. |
| R | User rating matrix (URM). Collection of ratings expressed by users in domain A. |
| W | Item content matrix (ICM). Collection of content features of items in domain T. |
| Operator* | It denotes the transpose of a matrix or a vector (e.g., Q* is the transpose of matrix Q). |
| Operator· | It denotes the inner product between two matrices or vectors (e.g., U · S is the inner product between matrix U and matrix S). |
| Function norm(a) | Function applied to vector a that normalizes the vector by its Euclidean norm. |
| Function norm(A) | Function applied to matrix A that normalizes all columns of the matrix by their respective Euclidean norms. |

The broadcast recommender system is composed by a back-end and a front-end module. The back-end module runs on a centralized server and it is responsible for delivering all data required by the front-end to generate recommendations. The front-end module runs on each user's STB (set top box) and it is responsible for tracking the user activity, storing the user profile, generating and displaying recommendations, and showing the media content selected by the user (generically referred to as items).

In addition to the media content stream, the key data sent by the back-end component to the STB is the recommendation model to be used for providing recommendations.

The back-end component communicates to the front-end via a one-way broadcast network, where the communication is unidirectional from the back-end to the front-end, while no data can be sent by the STB to the back-end.

It is provided that the STB tracks user activity and represents user preferences in the form of a sparse vector. For each item (e.g., a movie), the user can express a rating, i.e., an integer value in the 1-to-5 scale. This rating is referred to as explicit rating. For instance, after watching a movie the user is given the possibility to give a rating by clicking on a standard 1-to-5 star rating schema. If the user simply watches the item (e.g., in the case of a TV program) without expressing a rating, an implicit rating is saved. The value of the implicit rating varies from 3 to 5 and it is linearly proportional to the percentage of content the user has watched. If the user has watched less than 5 minutes the STB discards such activity. For each view greater or equals to 5 minutes, the implicit rating is computed as:

$$3+2\cdot t/l$$

where t is the time (in minutes) spent by the user watching the item, while/is the total length (in minutes) of the item.

Let us denote with $r_u$ the m-dimensional vector of ratings collected for a generic user u in the target domain. Element $r_{ui}$ of the user profile vector represents the rating (either explicit or implicit) of user u for item i, properly adjusted as follows:
- for all non-missing ratings, $r_{ui}$ is equals to the rating subtracted the constant $b_{ui}$. The value $b_{ui}$ is the rating bias and depends on: average users' rating bias, subjective user rating tendency, and item rating tendency. The bias can be defined per each (u,i) pair. In our invention we have set $b_{ui}$ equals to 2.5 for all (u,i) pairs.
- for all unknown ratings, $r_{ui}$ is set to zero. In fact, while pursuing a top-N recommendation task we do not care exact rating prediction, but we are only interested in correctly ranking items. The choice of zeros, that do not impact predictive power, gives the opportunity to use software tools optimized for sparse matrices.

User profile sparse vectors are stored in a data structure optimized for sparse values. For each rated item a pair of fields is stored: the TV program unique ID (e.g., a 32-bit long integer data) and the related—either implicit or explicit—unbiased user rating (e.g., a 32-bit float data), corresponding to a 8-byte requirement per watched item. For example, a user who has watched 500 items requires 4 Kbytes to store his/her preferences.

The method allows deploying both collaborative filtering and hybrid approaches, where collaborative and content-based filtering are used together within the same algorithm.

Every time the STB has to compute recommendations for a user, the STB:
1. uses the most updated recommendation model in order to predict the score $s_{ui}$ for each item i unrated by the user. The model has been previously sent by the back-end module via the broadcast communication channel.
2. sorts items in decreasing order of score.
3. selects the first N items of this sorted list and displays them to the user. For instance, the STB shows 10 items to the users.

Note that items already rated by the user are ignored and not recommended.

Collaborative

In a one-way TV system the service provider cannot centrally collect the preferences of users of the TV system. Such data represents the information required to use collaborative recommender systems.

Since this information is not available, the collaborative method according to the invention is based on transferring the required knowledge from an external, two-way domain—where user interactions can be globally collected—to the one-way domain where we want users to be recommended using a collaborative technique. Making reference to FIG. 1, the one-way domain is referred to as target domain (domain T) and the two-way domain is referred to as auxiliary domain (domain A) or as external source. The provider operating in the target domain is the provider T, while the provider operating in the auxiliary domain is the provider A.

For each item, provider T is supposed to know a set of information related to the content (e.g., the title, the set of actors, the directory, the plot), while provider A is supposed to known the preferences of its customer bases about items in the catalog.

As shown in FIG. 1, the process is decomposed in three steps:
1. Provider A collects preferences of users in domain A about the set of items common to domain T. Preferences about items existing in domain A but not existing in domain T can be preferably also collected. In fact, despite they will not be recommended, they can leverage indirect relationships among user preferences. A community model is built using such data and a suitable recommendation algorithm (known per se).
2. The community model is sent to provider T and adapted to domain T.
3. The adapted community model is broadcast to the STBs in order to enable recommendations.

For instance, domain A is consisting of a web portal through which a number of users can give their rating to a number of items (movies, shows, . . . ) while domain T is a back-end server of a TV broadcasting company. It is not prevented that the same TV broadcaster could also manage a web portal where users can watch TV programs, read the description, and express a rating. It shall be noted that there is no need for the users of the two systems (e.g., the traditional TV set and the catch-up TV web portal in domain A) to be the same. There is not even the need to identify them. Consequently, not necessarily the external source (auxiliary domain) must be managed by the same provider as the one that manages the target domain.

This opens the opportunity to implement a sort of recommendation model market, where behavioral patterns of users in a domain (domain A) can be sold/transferred to another domain (domain T) where this information is lacking or poor due to the one-way channel.

The auxiliary domain allows the external provider to collect preferences of its customer base.

Auxiliary domain users' preferences are compactly stored in a n×$\overline{m}$ user rating matrix (URM), denoted by R, i.e., a collection of all ratings implicitly or explicitly expressed by the n users registered with the external provider about the $\overline{m}$ items available in domain A's catalog. Note that R stores the unbiased user ratings, i.e., each rating of user e about item i is subtracted the bias $b_{ei}$.

Provider A runs a collaborative recommendation algorithm over the collected URM and obtains a community recommendation model. Thus, the only data required to be shared with the target domain's provider is the recommendation model. Since such model contains only a representation of user behavioral patterns this ensures the highest level of privacy.

In order to properly use the data coming from the auxiliary domain, it is preferably provided to align the items in the two domains.

If it is assumed there exists a (third-party) unique identifier common to provider A and T, that allows to uniquely identify an item with an independent identifier, data coming from the external source can be straightforwardly aligned to the catalog in the target domain. As a non-limiting example, movies and TV programs can be uniquely identified via the IMDb (Internet Movie Database, http://www.imdb.com/) identifier. In such a way, both the target and the auxiliary domain are able to map their movies and TV programs to the IMDb identifier.

By contrast, if provider A and provider T do not share a common, unique identifier, let us suppose that:

the catalogs of items in the target and auxiliary domains are composed by the same sets of m items (e.g., m video-on-demand movies); however the item indexes in the two catalogs might not correspond (e.g., item i in the target domain can be different from item i in the auxiliary domain).

the collaborative model built on the auxiliary domain is represented by a k×m matrix, denoted with M, where the m columns of M model the m items in the catalog.

imdbid(c,i) is a mapping function that, given an item index i and a catalog c, returns the IMDb identifier for item i in catalog c. The item index i is in the range [0, m], while c is either the 'target' or the 'auxiliary' domain.

Given this set of information, a model $\overline{M}$ suitable for the target domain starting from model M can be built.

1. For each item j∈[1, m] a IMDb identifier is derived by calling imdbid('target', j). Let us denote the identifier with $id_j$.

2. For each item i∈[1, m] the IMDb identifier is derived by calling imdb('auxiliary', i). When an item i is found such that imdbid('target', j) is equals to imdbid('auxiliary', i) the i-th column of M is assigned to the j-th column of $\overline{M}$.

Every time there is a data exchange between domain A and domain T it is needed to align such data using the previous mechanism. For simplicity, in the rest of the discussion it is assumed that:

Domain A's catalog corresponds to domain B's catalog and $\overline{m}$=m.

Items have already been aligned, i.e., imdbid('target', i)=imdbid('auxiliary',i) for all items.

One Way SVD (OWSVD)

Latent factor models—also informally known as SVD models—try to explain ratings by characterizing items and users with factors that are automatically inferred from user feedback. A preferred embodiment of the invention, provides that a Singular value decomposition (SVD), a particular matrix factorization technique used in different fields, is employed in the first step of the process to build the community model.

The key idea of OWSVD is to factorize by means of SVD the user-item rating matrix R built with the auxiliary domain data. The user rating matrix is decomposed into the product of two lower rank matrices, one containing the so-called 'user factors', while the other one containing the so-called 'item-factors'.

It is assumed that users and items can be represented by means off features. Thus, each user e is represented with an f-dimensional user factors vector $p_e \in \Re f$. Similarly, each item i is represented with an item factors vector $q_i \in \Re f$. Given the sparse matrix R, i.e., the URM of the auxiliary domain, provider A can use existing highly optimized software packages for performing conventional SVD on sparse matrices (e.g., experiments have been carried out with SVDLIBC based on the SVDPACKC library; see M. W. Berry. "Large-scale sparse singular value computations". The International Journal of Supercomputer Applications, 6(1):13-49, Spring 1992.).

By means of SVD, the user rating matrix R is approximated in the f-dimensional feature space by the product:

$$U \cdot S \cdot Q^*$$

where, U is a n×f orthonormal matrix, Q is a m×f orthonormal matrix, and S is a f×f diagonal matrix containing the first f singular values, in order of decreasing magnitude.

Matrix Q is computed by provider A and it represents the model to be transferred from the auxiliary domain to the target domain. Thus, the set-top-box STB is sent this matrix Q that will be used in order to recommend the user at real-time.

Remember that Q is to be aligned to target-domain item indexes when transferred from domain A to domain T.

The storage requirements of the recommendation model Q linearly depend on the number of items. For each item it is required to store f features, e.g., f 32-bit floats per item. For example, assuming a catalog of TV programs composed by 10,000 items, it would need about 8 Mbytes to store the recommendation model. Such 8-Mbyte model is regularly broadcast by Provider T to every STB in order to update the recommendation model.

Once model Q has been received by STB, it can be used by the embedded software module in order to recommend the users interacting with such apparatus.

In fact, let us define P=U·S, so that the e-th row of P represents the user factors vector $p_e$, while the i-th row of Q represents the item factors vector $q_i$. In addition, since U and Q have orthonormal columns, it can be straightforwardly derived that:

$$P=U \cdot S=R \cdot Q$$

Due to these properties, the STB can eventually predict the score $s_{ui}$ of user u for any item i performing the next two-step computation:

$$\overline{r}_u = r_u \cdot Q \quad \text{(step 1)}$$

where $r_u$ is the m-dimension vector of known ratings and $\overline{r}_u$ represents user-u model in a f-dimensional space $$s_{ui}=b_{ui}+\overline{r}_u \cdot q_i^* \quad \text{(step 2)}$$

The above two mathematical operations, executed in that specific order, make the computation feasible on every STB, regardless the computational and memory capabilities.

In fact, supposing user u has rated $|r_u|$ items:

Step 1 requires $f \cdot |r_u|$ multiplications and $f \cdot |r_u|$ sums.

Step 2 requires f multiplications and f sums.

Note that step 1 is common to all items it is needed to compute the score for; so, in order to compute score for any other item, we only need to run step 1 once and repeat step 2 for each item.

The items with the highest scores will be recommended to the user.

One Way SVD offers the benefits of representing users as a combination of item features without any user-specific parameterization. It also offers convenient optimization, which does not require tuning learning constants. The only parameter of OWSVD is f, i.e., the number of features used to represent users and items. Such parameter can be tuned via cross-validation. However, in typical applications a value of f in the range [200, 300] generally leads to good-quality recommendations. The fact that OWSVD requires a single parameter to be set makes the algorithm particularly suitable to be transferred across different domains, as in the settings of the one-way system of the invention where the algorithm is trained with domain-A users, but used on domain-T users.

Hybrid Collaborative+Content

Some catalogs have a large number of items with no ratings at all. In particular, TV applications deal with a catalog of available items (e.g., TV programs) that is very dynamic and the percentage of rated items is as low as 20%. Furthermore, can it be the case that some items existing in the target domain do not exist in the auxiliary domain where pure collaborative model is to be computed, leading to a URM (built with the auxiliary domain data) only partially complete. In particular, all columns of R related to items existing in the target domain but not existing in the auxiliary will be unfilled.

On the other way, all items existing in the auxiliary domain but not existing in the target domain can optionally be maintained in the URM. In fact, despite they will not be recommended, they can leverage indirect relationships among ratings.

In the following two hybrid (collaborative+content) techniques tailored for broadcast recommender systems are provided: a first one called One Way Filtered Feature Augmentation (OWFFA) and a second one called One Way Similarity Injection Knn (OWSIKNN). The main idea behind the first hybrid technique is to use content-based filtering to augment the existing ratings used for the training of the collaborative algorithm. On the other hand, the second hybrid technique merges together the item-to-item similarities computed with collaborative and content-based filtering.

The two hybrid techniques have been developed in order: (i) to work on both implicit and explicit datasets, (ii) to grant good recommendations even when only content information is available (e.g., items in the target domain not existing in the auxiliary domain), (iii) to have on-line complexity comparable to that of non-hybrid techniques, (iv) to have no user-specific parameters. All the above properties grant to use such techniques in lightweight STBs operating in one-way channels.

One Way Filtered Feature Augmentation (OWFFA)

OWFFA is a feature augmentation method. Differently from other hybrid techniques, OWFFA approach does not need any user-specific parameter to be learned.

OWFFA computes user behavioral patterns on the basis of the ratings augmented with pseudo-ratings derived from the content-based filtering, but it uses the original user profiles for predicting ratings.

Figure 2:
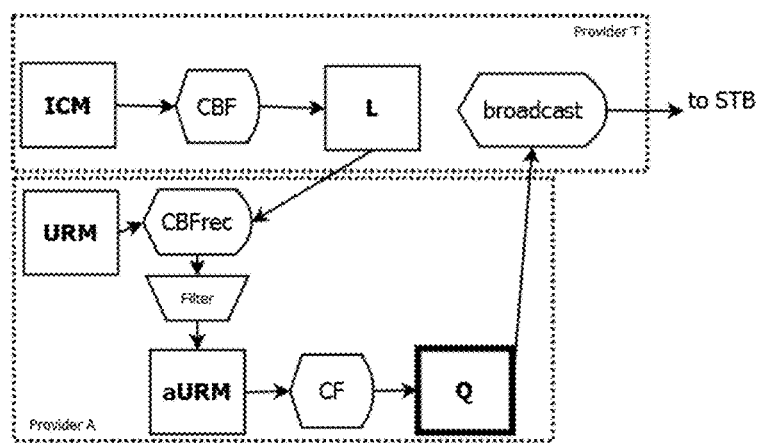
FIG. 2 is a flow-chart diagram showing one-way filtered feature augmentation technique applied in an embodiment of the invention.

FIG. 2 shows a flow chart explaining the learning process:

1. On the target domain, the Content-Based Filtering CBF module is composed by a content-based algorithm that receives as input the available content data W, i.e., the item content matrix ICM. Provider T trains the content-based algorithm with W and obtains the content-based model, that it is denoted by L. Such model is shared with provider A in the auxiliary domain A.

2. For each user in the auxiliary domain, provider A uses L in the Content-Based Filtering Recommender CBFrec module in order to predict all his/her unknown ratings. We refer to these additional ratings as pseudo-ratings.

3. Part of the pseudo-ratings is added to the original user rating matrix URM (built with auxiliary domain data). The filter component is in charge of selecting the subset of pseudo-ratings to be inserted in matrix R. The URM incremented with the pseudo-ratings selected by the filter is denoted by augmented URM (namely, aURM).

4. The augmented URM (aURM) is used as input for a collaborative filtering algorithm, implemented in the Collaborative Filtering CF module. Provider A runs the algorithm in CF module and obtains a model Q, that is shared with provider T. Such model will be sent to the STB by means of the broadcast module and used to compute recommendations.

In detail, CBFrec module computes content-based recommendations for users in the auxiliary domain. It is assumed that for each item such information is represented in a BOW (bag of words) vector, which neglects "semantic structure" of the item's description (e.g., the "meaning" of terms and their relationships). All item content vectors are compactly stored in a matrix, referred to as ICM (item content matrix), denoted by W, whose i-th column corresponds to item-i BOW vector. Element $w_{xi}$ represent the importance of content feature x for item i. As an example, $w_{xi}$ can be set to 1 whether feature x exists in item i and to 0 if such feature is not present. Content data are directly available in target domain, for instance in the form of EPG (Electronic Programming Guide). It is assumed W has dimension w×m, where w is the number of content features and m the number of items in the target domain catalog. Matrix W is to be shared with the auxiliary domain's provider in order to enrich data. The next steps are performed by the auxiliary domain's provider in order to obtain a recommendation model.

The correlation between user's and item's BOWs is related to the interest of the user for the item. The CBF module is based on LSA (Latent Semantic Analysis), a technique extensively used in information retrieval. LSA uses SVD (singular value decomposition) to represent the BOW vectors in a low-dimensional space, where data noise is attenuated and correlations between related content features are strengthened.

Given the ICM as input, using LSA the target domain's provider computes matrix L, which represents items in a low-dimensional space. L is a k×m matrix modeling the item latent features. Item i-th is represented in a k-dimension feature space by the i-th column of L. Matrix L is computed as follows. Given W (w×m), throughout SVD decomposition it can approximated as the product B·G·V*, where G is a k×k diagonal matrix formed by the highest k singular values (in decreasing order of magnitude), B is a w×k matrix so that B*B=$I_k$, and V is a m×k matrix so that V*V=$I_k$, with $I_k$ representing the k×k identity matrix. Finally it is defined L:=norm(G·V*), where each column of the product G·V* is normalized by the Euclidean norm.

Matrix L is shared with the auxiliary domain's provider that computes the pseudo-rating of the each unknown rating value of its users. The pseudo-rating $p_{ei}$ related to user e about item i is computed using the formula:

$$p_{ei} = \text{norm}(r_e \cdot L^*) \cdot l_i$$

where $l_i$ indicates the i-th column of matrix L.

Once pseudo-ratings are computed, the filter selects only the most relevant ones to be added to the URM. Two different filters are implemented: FFAt and FFAg. The former (FFAt) excludes all the pseudo-ratings whose value is lower than a fixed threshold. On the other hand, the latter uses the Gini impurity measure in order to add both high and low pseudo ratings to increase the intrinsic information to the item profiles (FFAg). FFAg is to be preferred in the case most ratings received by the item are explicit, while FFt is to be preferred in the case most ratings received by the item are implicit.

For each item i, the Gini impurity value $g_i$ is computed as a function depending on the number of ratings collected for such item—denoted by $\beta$. The function is defined so that: (i) each item has at least $\beta_{min}$ ratings, (ii) known user ratings have priority over pseudo-ratings, and (iii) also items with many ratings are enhanced with a number of pseudo-ratings. The formula for $g_i$ is:

$$g_i = \beta_{min} - \beta + (h \cdot \beta) \text{ if } \beta <= \beta_{min}$$

$$(h \cdot \beta^2)/\beta \text{ otherwise}$$

where h is an additional parameter that can be optimized through cross-validation (we have experimented with h=0.3). Furthermore, $\beta_{min}$ is set equal to the average number of ratings per item.

Once the augmented URM has been built, the collaborative algorithm One Way SVD can be used in order to compute a portable model. In particular, One Way SVD algorithm is used where the input matrix R is the augmented URM. The output model is matrix Q that is sent to the STB in order to be used at real-time to recommend the user. The storage requirements of Q are the same of the ones discussed for OWSVD, i.e, for each item it is required to store f features, e.g., f 32-bit floats per item.

The STB is broadcast the model Q that allows predicting the score of user u for item i with the following two-step computation:

$$\overline{r}_u = r_u \cdot Q \quad \text{(step 1)}$$

$$s_{ui} = b_{ui} + \overline{r}_u \cdot q_i^* \quad \text{(step 2)}$$

The complexity of this two-step computation is the same as of OWSVD, so that it can be computed by any STB.
Finally, the items with the highest scores are selected by the STB and recommended to the user.

One Way Similarity Injection Knn (OWSIKNN)

OWSIKNN builds a model using item-to-item similarities obtained by one collaborative and one content-based technique. The basic idea is to merge the following two data:

The item-to-item similarities computed by means of collaborative filtering trained on the auxiliary domain ratings. Such similarities can be compactly stored in a m×m matrix that it is denoted by $Z^A$, whose element $z_{ij}^A$ represents the similarity between item i and item j according to the ratings available in the auxiliary domain. Such matrix is computed by the auxiliary domain's provider and shared with the target domain's provider.

The item-to-item similarities computed by means of content-based filtering trained on the content data retrieved by the EPG (Electronic Programming Guide) available to the target domain's provider. Such similarities can be compactly stored in a m×m matrix that it is denoted by $Z^T$, whose element $z_{ij}^T$ represents the similarity between item i and item j according to the content description available in the target domain. Such matrix is computed by the target domain's provider.

Figure 3:
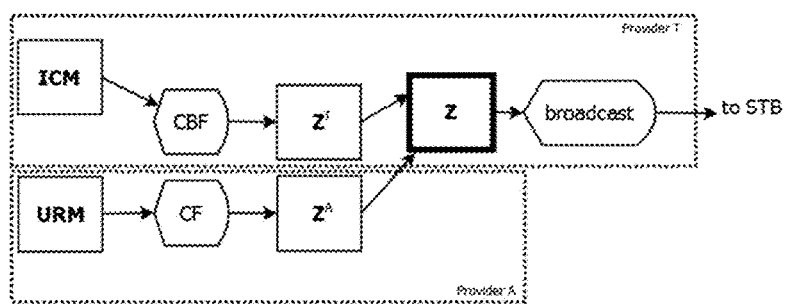
FIG. 3 is a flow-chart diagram showing one way similarity injection Knn technique applied in another embodiment of the invention.

FIG. 3 summarizes the process. In detail, similarity matrix $Z^A$ is computed by CF module according to the following steps:

Provider A uses the OWSVD technique in order to compute the collaborative model Q over the auxiliary domain's URM. Vector $q_i$ represents again the i-th row of Q. For each item 1:

in the i-th column of $Z^A$, denoted by $z_i^A$, the similarities of i with all items j∈[1, m] are stored; the column is computed as $z_i^A = \text{norm}(Q) \cdot \text{norm}(q_i^*)$;

the highest k non-zeros values of $z_i^A$ is selected, setting the value of the remaining element of the i-th column to zeros; this step is required in order to control and limit the size of $Z^A$.

Similarity matrix $Z^A$ is shared with the target domain's provider.

On the other hand, similarity matrix $Z^T$ is computed by the provider T using the item content data (i.e., the ICM) with a content-based algorithm implemented in the CBF module. In particular:

using the same LSA-based technique described for OWFFA, matrix L is computed using the ICM as input. For each item i:

in the i-th column of $Z^T$, denoted by $z_i^T$, the similarities of i with all items j∈[1, m] are stored; the column is computed as $z_i^T = \text{norm}(L^*) \cdot \text{norm}(l_i)$, with $l_i$ i-th column of L;

the highest k non-zeros values of $z_i^T$ is selected, setting the value of the remaining element of the i-th column to zeros; this step is required in order to control and limit the size of $Z^T$.

Once the two similarity matrices have been computed the target domain's provider can merge them into a unique item-to-item similarity matrix Z by adopting the following two-step process:

for each column of $Z^A$, the top-k the elements are copied into Z; thus, each column is filled with the highest k similarity values deriving from the collaborative filtering computed on the auxiliary domain data;

for each column of $Z^T$, the top elements are inserted into the corresponding empty (e.g., zeros) elements of Z in such a way to have, for each item, a total of 2 k non-zeros similarity values.

Finally, matrix Z represents the recommendation model that has to be sent by the broadcast module to the set-top-box STB in order to generate recommendations. The storage requirements of the recommendation model Z linearly depends on the number of items. For each item it is needed to store k features, e.g., k 32-bit floats per item. For example, assuming a catalog of TV programs composed by 10,000 items, about 8 Mbytes are needed to store the recommendation model. Such 8-Mbyte model is regularly broadcast by Provider T to each of its set-top-boxes STBs in order to update the recommendation model.

The STB, given the user rating vector $r_u$ with known ratings of the user u to be recommended, can compute score for any unrated item i as:

$$s_{ui} = b_{ui} + r_u \cdot z_i^*$$

where $z_i$ indicates the i-th column of matrix Z.

The complexity of computing the score depends on: (i) the number of known user ratings $|r_u|$ and (ii) the parameter k. The optimal k can be computed by means of cross-validation. However, in typical applications a value of k in the range [150, 300] generally leads to good-quality recommendations. In the worst case, the computation of $s_{ui}$ requires $k_s$ multiplications and $k_s$ sums, with $k_s$ equals to the minimum between $|r_u|$ and 2·k. This makes also OWSIKNN feasible in any STB.

Finally, the items with the highest scores will be recommended to the user by the STB.

As can be evinced from the above-reported description, the system and method according to the invention allows to achieve the desired results.

As a matter of fact, through the composition of a dual-module collaborative recommender system, a collaborative model can be applied also to broadcast one-way communication channels, so as to efficiently recommend items to users. The first module of the recommender system runs on a centralized computer connected to the Internet, which module can leverage external data sources to collect community based information required for collaborative recommendations, without any computational constrain. The external information gathered by the first module in a auxiliary domain, is transformed into a compact representation of users' tastes (the model) and easily broadcast to the set-top-boxes STB of the system. The second module, supplying the actual and final recommendation, can easily run on each user's STB giving a reliable recommendation even if the users is different from the users analyzed by first module.

The key differentiating points and advantages of the invention over the prior art are:

1. Recommendations are generated on the STB on the basis of a recommendation model that is generated by a back-end service and regularly sent to the STB.

2. Advanced recommendations can be generated by STBs regardless their limited capability in terms of computation and memory.

3. The framework allows the use of both 'content-based filtering' and 'collaborative filtering' recommender systems, the latter not explored in prior art solutions.

4. Recommendations based on 'Collaborative filtering' can be generated by the STB on the basis of a collaborative recommendation model sent by the back-end service to the STB. Such model can either be built on the basis of data (e.g., ratings, user views) retrieved in alternative domains that work in two-way channels, or even be exchanged among content providers. This leads to a potential recommendation model market.

5. 'Content-based' recommendation algorithms are mainly based on the available metadata that describe the items. In particular, in the settings of TV programs, such metadata are usually extracted from the EPG (Electronic Programming Guide), where the available information does not typically go over the 'genre' (e.g., TV show, TV series, newscast). Poor metadata means poor recommendations. On the contrary, collaborative solutions applied according to the invention are known to be independent from the presence of metadata, and to be able to produce recommendations with a general quality higher than content-based approaches.

Another advantage of the invention, is connected with privacy concerns. Traditional recommender systems collect and use sensible user information, representing a possible issue for privacy. The use of the invention on one-way distribution channels significantly changes this scenario because user preferences and activities are stored client-side (in the STB) and never shared in a centralized server, removing all privacy problems. Note that the model built with domain-A users' data and shared with provider T and all connected STBs does not contain any user-specific data, but only aggregate information of the customer base behavioral patterns, still preserving privacy.

It is nevertheless understood that the invention is not limited to the particular embodiments illustrated above, which represent only a non-limiting example of the scope of the invention, but that a number of variants are possible, all within the reach of a person skilled in the field, without departing from the scope of the invention as defined by the attached claims.

The invention claimed is:

1. A recommender system on a one-way broadcast network, comprising:
   a set-top-box (STB) device of a first set of users of the one-way broadcast network, the set-top-box (STB) device of the first set of users operatively connected to a television (TV) set of the first set of users, the set-top-box (STB) device of the first set of users comprising i) a memory that stores a user profile, and ii) a computation device that tracks the first set of users' activity, generates, and displays a ranking of recommended media items on the TV set, said ranking being determined by said computation device through a recommender model stored on said memory;
   a broadcasting station connected to the set-top-box (STB) device of the first set of users via a one-way channel that transmits data to the set-top-box (STB) device of the first set of users;
   an auxiliary server connected to a bidirectional network, the auxiliary server and the bidirectional network both belonging to an auxiliary domain;
   a first back-end module running on the auxiliary server, the first back-end module belonging to the auxiliary domain and leveraging external data sources to collect community based information;
   a collaborative dual module comprising first and second modules,
   said first module being said first back-end module, leveraging external data sources to collect community based information belonging to the auxiliary domain on at least part of said media items, and said recommender model stored on said memory of the set-top-box (STB) device of the first set of users being said second module comprised of a second front-end module, wherein,
   the broadcasting station and said set-top-box device of the first set of users belong to a target domain,
   said auxiliary server is part of said bidirectional network, comprising at least two channels to gather feedback data from a second set of users belonging to the auxiliary domain on at least part of said media items, said first back-end module is processed by said auxiliary server through collaborative techniques including said feedback data collected from said second set of users,
   said first back-end module is transformed in a compact representation by said auxiliary server and one-way broadcast to said set-top-box (STB) device of the first set of users,
   wherein users' preferences of the auxiliary domain are compactly stored in a n×m̄ user rating matrix R (URM) that is a collection of all ratings implicitly or explicitly expressed by "n" users of the second set of users registered with an external provider about the "m̄" items available in a catalog of the auxiliary domain,
   wherein said user rating matrix R (URM) is factorized by means of a singular value decomposition (SVD) model to decompose the user rating matrix R (URM) into a product of lower rank matrices to be approximated in a f-dimensional feature space by the product:

$$U \cdot S \cdot Q*$$

where "U" is a n×f orthonormal matrix, Q* is the transpose of "Q" which is a m×f orthonormal matrix, "S" is a f x f diagonal matrix containing the first "f" singular values, in order of decreasing magnitude, where "n", "m", and "f" are greater than zero, and wherein Q is representing the recommender model to be transferred from said auxiliary domain to said target domain.

2. The recommender system as in claim 1, wherein said second set of users is different from said first set of users.

3. The recommender system as in claim 2, wherein said computation capacity unit, through said second front-end module, tracks locally behavior of the user of said first set of users and compares the behavior of the user of said first set of users with the behavior of the other users of said second set of users, in order to provide said ranking of recommended media items.

4. The recommender system as in claim 3, wherein said first back-end module is processed through hybrid recommender algorithms by combining both collaborative and content-based techniques including additional items different from said media items.

5. The recommender system as in claim 2, wherein said first back-end module is processed through hybrid recommender algorithms by combining both collaborative and content-based techniques including additional items different from said media items.

6. The recommender system as in claim 1, wherein said computation capacity unit, through said second front-end module, tracks locally behavior of the user of said first set of users and compares the behavior of the user of said first set of users with the behavior of the other users of said second set of users, in order to provide said ranking of recommended media items.

7. The recommender system as in claim 6, wherein said first back-end module is processed through hybrid recommender algorithms by combining both collaborative and content-based techniques including additional items different from said media items.

8. The recommender system as in claim 1, wherein said first back-end module is processed through hybrid recommender algorithms by combining both collaborative and content-based techniques including additional items different from said media items.

9. A one-way broadcast program recommendation method comprising:

providing a one-way channel connecting a broadcasting station to a set-top-box (STB) device of a first set of users of the one-way broadcast network, wherein said set-top-box (STB) device of the first set of users is arranged for tracking the user activity, storing a user profile, generating and displaying on a television (TV) set a ranking of recommended media items, said ranking being determined by a computation unit of said set-top-box (STB) device of the first set of users through a recommender model stored in a memory thereof, including operating a collaborative dual module comprising a first module and a second module, connecting an auxiliary server to a bidirectional network, the auxiliary server and the bidirectional network both belonging to an auxiliary domain, running the first module on the auxiliary server as a first back-end module, the first back-end module leveraging external data sources to collect community based information belonging to the bidirectional network both on at least part of said media items, with the second module being a second front-end module representing said recommender model stored on said memory of the set-top-box (STB) device of the first set of users belonging to a target domain, and using at least two channels of said auxiliary server to gather feedback data from a second set of users belonging to the bidirectional network both on at least part of said media items, using said auxiliary server to process said first back-end module through collaborative techniques including said feedback data collected from said second set of users, and using said auxiliary server to transform said first back-end module into a compact representation and one-way broadcast to said set-top-box (STB) device of the first set of users where the compact representation is the recommender model implemented as said second front-end module, wherein users' preferences of the auxiliary domain are compactly stored in a n×m user rating matrix R (URM) that is a collection of all ratings implicitly or explicitly expressed by "n" users of the second set of users registered with an external provider about the "m" items available in a catalog of the auxiliary domain, wherein said user rating matrix R (URM) is factorized by means of a singular value decomposition (SVD) model to decompose the user rating matrix R (URM) into a product of lower rank matrices to be approximated in a f-dimensional feature space by the product:

$$U \cdot S \cdot Q*$$

where "U" is a n x f orthonormal matrix, Q* is the transpose of "Q" which is a m x f orthonormal matrix, "S" is a f x f diagonal matrix containing the first "f" singular values, in order of decreasing magnitude, where "n", "m", and "f" are greater than zero, and wherein Q is representing the recommender model transferred from said auxiliary domain to said target domain.

10. A one-way broadcast program recommendation method, comprising:

connecting a set-top-box (STB) device of first set of users to a television (TV) set of a first user of the first set of users, the set-top-box (STB) device of the first set of users comprising i) a memory that stores a first user profile, and ii) a computation device that, through a front-end module, tracks the first user's activity, generates, and displays a ranking of recommended media items on the TV set, said ranking being determined by said computation device through the front-end module, the front-end module comprised of a recommender model stored on said memory, the set-top-box (STB) device of the first set of users belonging to a target domain;

operating a broadcasting station with a one-way channel that transmits data to the set-top-box (STB) device of the first set of users, wherein no user activity data is received by the broadcasting station from the set-top-box (STB) device of the first set of users, the broadcasting station belonging to the target domain;

operating an auxiliary server connected to a bidirectional network and to the broadcasting station, the auxiliary server comprising a back-end module that collects community-based information belonging to an auxiliary domain from external data sources, the auxiliary server and the bidirectional network both belonging to the auxiliary domain separate from the target domain;

using the auxiliary server to gather feedback data from behavior of a second set of users belonging to the auxiliary domain on at least part of said media items, to transform the back-end module into a compact representation, and to provide the compact representation to the set-top-box in a one-way communication via the one-way channel, the compact representation provided to the set-top-box being an updated recommender model; and using the computation device and the first user profile in the set-top-box (STB) device of the first set of users to compare the first user's tracked activity with the behavior of the second set of users to generate and display the ranking of recommended media items on the TV set, wherein preferences of the auxiliary domain users are compactly stored in a n×m̄ user rating matrix R (URM) that is a collection of all ratings implicitly or explicitly expressed by "n" users of the second set of users registered with an external provider about the "m̄" items available in a catalog of the auxiliary domain, wherein said user rating matrix R (URM) is factorized by means of a singular value decomposition (SVD) model to decompose the user rating matrix R (URM) into a product of lower rank matrices to be approximated in a f-dimensional feature space by the product:

$$U \cdot S \cdot Q^*$$

where "U" is a n x f orthonormal matrix, Q* is the transpose of "Q" which is a m x f orthonormal matrix, "S" is a f×f diagonal matrix containing the first "f" singular values, in order of decreasing magnitude, where "n", "m", and "f" are greater than zero, and wherein Q is representing the updated recommender model being transferred from said auxiliary domain to said target domain.

* * * * *